(12) United States Patent
Bleth et al.

(10) Patent No.: US 9,586,184 B2
(45) Date of Patent: Mar. 7, 2017

(54) AIR-POWERED WATER CIRCULATION SYSTEMS FOR PONDS, LAKES, MUNICIPAL WATER TANKS, AND OTHER BODIES OF WATER

(71) Applicant: Medora Environmental, Inc., Dickinson, ND (US)

(72) Inventors: Joel J. Bleth, Dickinson, ND (US); Douglas P. Walter, Dickinson, ND (US); Jonathan L. Zent, Dickinson, ND (US); Corey M. Simnioniw, Belfield, ND (US); Willard R. Tormaschy, Dickinson, ND (US)

(73) Assignee: Medora Environmental, Inc., Dickinson, ND (US)

( * ) Notice: Subject to any disclaimer, the term of this patent is extended or adjusted under 35 U.S.C. 154(b) by 101 days.

(21) Appl. No.: 14/520,002

(22) Filed: Oct. 21, 2014

(65) Prior Publication Data
US 2015/0108054 A1 Apr. 23, 2015

Related U.S. Application Data

(60) Provisional application No. 61/894,217, filed on Oct. 22, 2013.

(51) Int. Cl.
| | |
|---|---|
| *C02F 7/00* | (2006.01) |
| *B01F 3/04* | (2006.01) |
| *B01F 13/00* | (2006.01) |
| *C02F 1/20* | (2006.01) |

(52) U.S. Cl.
CPC ...... *B01F 3/04517* (2013.01); *B01F 3/04255* (2013.01); *B01F 3/04262* (2013.01); *B01F 13/0049* (2013.01); *C02F 7/00* (2013.01); *B01F 2003/04148* (2013.01); *B01F 2003/04319* (2013.01); *C02F 1/20* (2013.01); *C02F 2303/185* (2013.01); *Y02W 10/15* (2015.05)

(58) Field of Classification Search
CPC .... C02F 7/00; B01F 3/04262; B01F 3/04517; B01F 13/0049; B01F 2003/04148; B01F 2003/04319
USPC .............. 210/170.05, 170.06, 170.09, 242.2; 261/77, 120, 124
See application file for complete search history.

(56) References Cited

U.S. PATENT DOCUMENTS

| | | | |
|---|---|---|---|
| 2,165,889 A | 7/1939 | Fischer et al. | |
| 3,794,303 A | * 2/1974 | Hirshon | .............. B01F 3/04517 261/120 |

(Continued)

*Primary Examiner* — Christopher Upton
(74) *Attorney, Agent, or Firm* — W. Scott Carson

(57) ABSTRACT

An air-powered water circulation system for ponds, lakes, municipal water tanks, and other bodies of water having a draft tube extending along and about a vertical axis between upper and lower end portions and supported by a flotation arrangement with the upper end portion slightly below the water surface. A pneumatic, air flow arrangement is then provided to supply pressurized air from an aft pump to a plurality of submerged air pipes positioned within the draft tube below the upper end portion thereof and extending inwardly from a submerged manifold toward the interior of the draft tube. In operation, pressurized air is supplied from the air pump through an air delivery conduit to the submerged air manifold and into the submerged air pipes where it is discharged as air bubbles through series of discharge holes extending along the pipes to create an overall circulation pattern in the body of water.

26 Claims, 18 Drawing Sheets

(56) References Cited

U.S. PATENT DOCUMENTS

| | | | |
|---|---|---|---|
| 4,070,423 A * | 1/1978 | Pierce | B01F 3/04517 210/242.2 |
| 4,229,302 A | 10/1980 | Molvar | |
| 4,690,756 A * | 9/1987 | Van Ry | C02F 1/24 210/170.06 |
| 4,797,063 A | 1/1989 | Lott | |
| 5,681,509 A | 10/1997 | Bailey | |
| 5,938,983 A | 8/1999 | Sheaffer et al. | |
| 7,306,719 B2 | 12/2007 | Tormaschy et al. | |
| 7,329,351 B2 | 2/2008 | Roberts et al. | |
| 7,332,074 B2 | 2/2008 | Tormaschy et al. | |
| 7,517,460 B2 | 4/2009 | Tormaschy et al. | |
| 7,644,909 B2 | 1/2010 | Huhta-Koivisto et al. | |
| 7,713,031 B2 | 5/2010 | Dane | |
| 7,789,553 B2 | 9/2010 | Tormaschy et al. | |
| 8,226,292 B1 * | 7/2012 | Walter | B01F 13/0049 210/170.05 |
| 8,523,984 B2 | 9/2013 | Simnioniw et al. | |
| 8,870,168 B1 * | 10/2014 | McGuffin | B01F 3/04517 261/124 |
| 2003/0127754 A1 | 7/2003 | Ruzicka | |
| 2005/0242450 A1 * | 11/2005 | Witheridge | C02F 7/00 261/77 |
| 2007/0160425 A1 | 7/2007 | Bergman | |
| 2007/0295672 A1 | 12/2007 | Tormaschy | |
| 2008/0000841 A1 * | 1/2008 | Mitchell | C02F 7/00 210/242.2 |
| 2009/0230041 A1 | 9/2009 | Sun | |

* cited by examiner

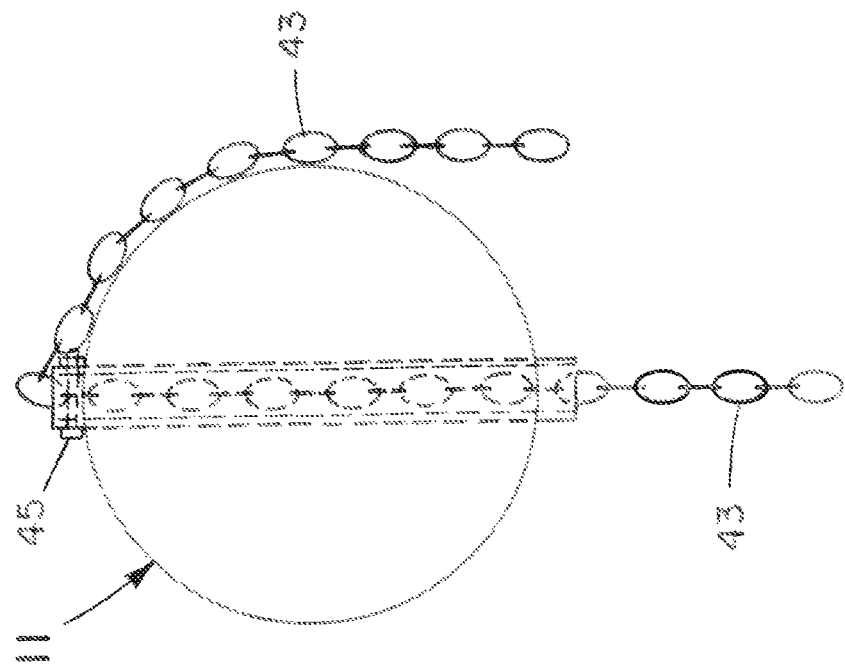
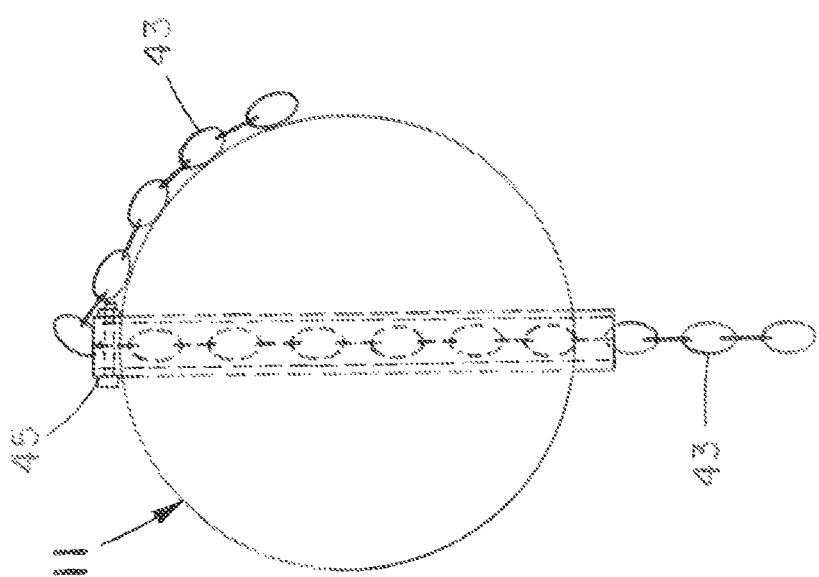
Fig. 15

*Fig. 16*
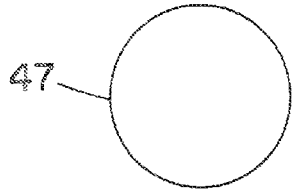
1/2" Dia. Bubble
Surface Area: 0.7854 sq. in.
Volume: 0.0654 cu. in.
1/8" Dia. Bubble
Surface Area: 0.0491 sq. in.
Volume: 0.0010 cu. in.
One 1/2" bubble is equivalent to 64 1/8" bubbles in volume and provides x4 times the surface area.
(1) 1/2" Dia. Bubble
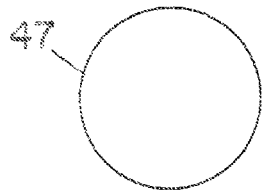
Surface Area: 0.7854 sq. in. Volume: 0.0654 cu. in.
(64) 1/8" Dia. Bubble
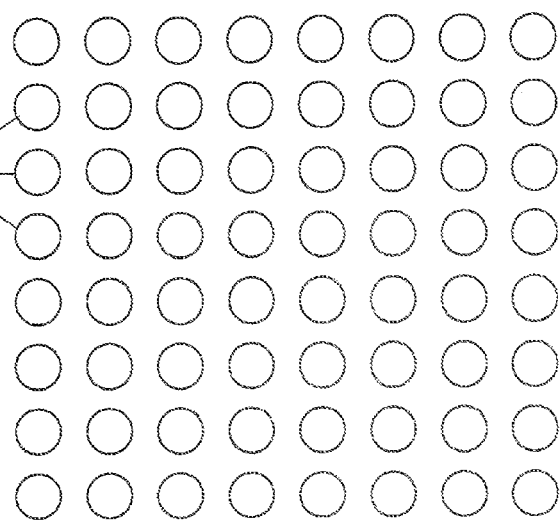
Surface Area: 3.1424 sq. in.
Volume: 0.0654 cu. in.

AIR-POWERED WATER CIRCULATION SYSTEMS FOR PONDS, LAKES, MUNICIPAL WATER TANKS, AND OTHER BODIES OF WATER

RELATED APPLICATIONS

This application claims the benefit of U.S. Provisional Patent Application Ser. No. 61/894,217 filed Oct. 22, 2013, which is incorporated herein by reference.

BACKGROUND OF THE INVENTION

1. Field of the Invention

This invention relates to the field of water circulation systems for ponds, lakes, municipal water tanks, and other bodies of water.

2. Discussion of the Background

Water circulation systems commonly use electrically powered motors to drive pumps, impellers, and other mechanical devices to circulate the water in a pond, lake, municipal water tank, or other body of water. While effective, such electrically powered systems typically have multiple drawbacks including frequent maintenance problems, safety risks, high visibility, noise, and relatively large power consumption.

In particular, maintenance problems and costs can occur from such items as motor breakdowns and clogging of the moving parts of the driving members including the pump or impeller due to trash (e.g., plastic and paper bags) and other debris (e.g., fishing line) in the water. Potential safety risks can also be present to people, aquatic animals, waterfowl, and fish by exposure to the moving parts of the system and from potential electrocution. Such maintenance and safety issues can make doing repairs while at the same time following established safety procedures particularly difficult and expensive in out of the way bodies of water and in municipal water tanks which often have restricted physical access and require special equipment and specially trained personnel.

Other drawbacks of an electrically powered system can be high visibility of the motor and driving parts above the water line and excessive, operating noise that can make the system undesirable for use in certain areas such as near a home or in the pond or lake of a public park or golf course. High visibility in particular can invite fouling by birds and damage and theft by vandals. Large power consumption to run high-flow, electric pumps or impellers is a further concern in such systems.

With these and other matters in mind, the present invention was developed. In it, a system is provided that uses only air as the motive force to create and maintain the circulation of the water in the body of water and that has no moving parts, thus addressing the drawbacks of electrically powered systems discussed above. Additionally and in potable water applications, the air-powered system of the present invention offers the additional advantage of providing air stripping to treat any undesirable disinfectant byproducts in the water.

SUMMARY OF THE INVENTION

This invention involves an air-powered water circulation system for ponds, lakes, municipal water tanks, and other bodies of water. The system includes a draft tube extending along and about a substantially vertical axis between upper and lower end portions. The draft tube is supported by a flotation arrangement that preferably positions and supports the upper end portion of the draft tube adjacent and slightly below the surface of the body of water. A pneumatic, air flow arrangement is then provided to supply pressurized air above ambient from an air pump (e.g., fan or blower) to a plurality of submerged air pipes positioned within the draft tube below the upper end portion thereof.

The air pipes extend inwardly from a submerged manifold toward the interior of the draft tube and the vertical axis with the submerged air manifold extending substantially horizontally about the vertical axis adjacent the cylindrical inner surface of the draft tube. The air manifold is in fluid communication with the air pump via an air delivery conduit. In operation, pressurized air above ambient is then supplied from the air pump through the air delivery conduit to the submerged air manifold and into the submerged air pipes to be discharged as air bubbles through series of discharge holes extending along the air pipes.

The bubbles reduce the density of the water in a first zone adjacent to and above the respective air pipes and extending to the water surface. Denser and higher pressure water in a second zone below the first zone of water then moves upwardly through the draft tube from the lower end portion thereof toward the first zone. In doing so, the rising water passes by the submerged air pipes reducing the density of this water which is rising from the lower, second zone to displace the water in the first zone. This water movement creates an overall, primary circulation pattern in the body of water that passes up through the draft tube from the lower end portion thereof to the upper end portion, substantially radially outwardly of the upper end portion substantially about the vertical axis toward the sides of the body of water, downwardly adjacent the sides of the body of water, and substantially radially inwardly and into the lower end portion of the draft tube. This overall, outer or primary circulation in turn creates an induced, inner or secondary circulation pattern within it. Together, these nearly laminar, circulation patterns preferably extend 360 degrees about the vertical axis to thoroughly and completely mix and circulate the water in the body of water whether the water is in a tank or an open air environment such as a pond or lake.

The draft tube is collapsible and expandable to position the inlet to the lower end portion of the draft tube above the bottom of the body of water or on the bottom. In this manner, the inlet depth to the draft tube can be set, for example, relatively shallow above any thermoclines to allow for blue-green algae control or at deeper anoxic depths to increase oxygenation and gassing off of undesirable gases (e.g., hydrogen sulfide) in the water as it is brought up from adjacent the bottom of the body of water to the atmosphere at the water surface.

The pressurized air passing from the air pump to the submerged manifold and discharged as bubbles from the submerged air pipes is the sole motive force in the preferred embodiment for creating and maintaining the overall primary and secondary water circulation patterns in the water. Further, the air bubbles in addition to providing the motive force also serve to treat the circulating water by adding oxygen to the water to accelerate the biological and solar processes that clean up the water. The resulting cleansing is particularly desirable as it relates to controlling or removing phosphorus, acidity, suspended solids, and volatile disinfectant byproducts such as trihalomethanes.

The air pipes in the array of the preferred embodiment extend substantially radially inwardly and upwardly from the manifold into the interior of the draft tube substantially in a conical fashion (e.g., truncated cone). The air pipes are closed at their outer ends and additionally extend inwardly of the manifold for different distances. The different lengths of the air pipes in this array and their positioning relative to each other create a non-uniform spacing pattern that forms a plurality of differently shaped and sized gaps between and among the air pipes. The non-uniform pattern aids in passing trash such as plastic and paper bags and other debris in the water up through the array of pipes so it does not hang up or clog on the pipes. This non-clogging and self-cleaning feature is further enhanced as the upwardly inclined air pipes naturally direct the debris upper toward a central gap in the array where the velocity of the rising water is greatest and because there are no moving parts in the draft tube. An alternate array has the air pipes extending in a parallel fashion completely across the manifold and the interior of the draft tube. In both arrays, the air conduit delivering pressurized air from the air pump to the submerged air manifold upstream of the arrays has a raised portion above the water surface adjacent the upper end portion of the draft tube. The raised portion forms an air trap that prevents water from undesirably rising from the submerged air manifold past the raised portion toward the air pump.

BRIEF DESCRIPTION OF THE DRAWINGS

FIG. 15 illustrates how the chains of the floats of the flotation arrangement can be adjusted to vary the submerged depth of the upper end portion of the draft tube below the water surface.

FIG. 16 illustrates the difference between air bubbles of different diameters and the effect it has on their surface area to volume ratios.

DETAILED DESCRIPTION OF THE INVENTION

Figure 1:
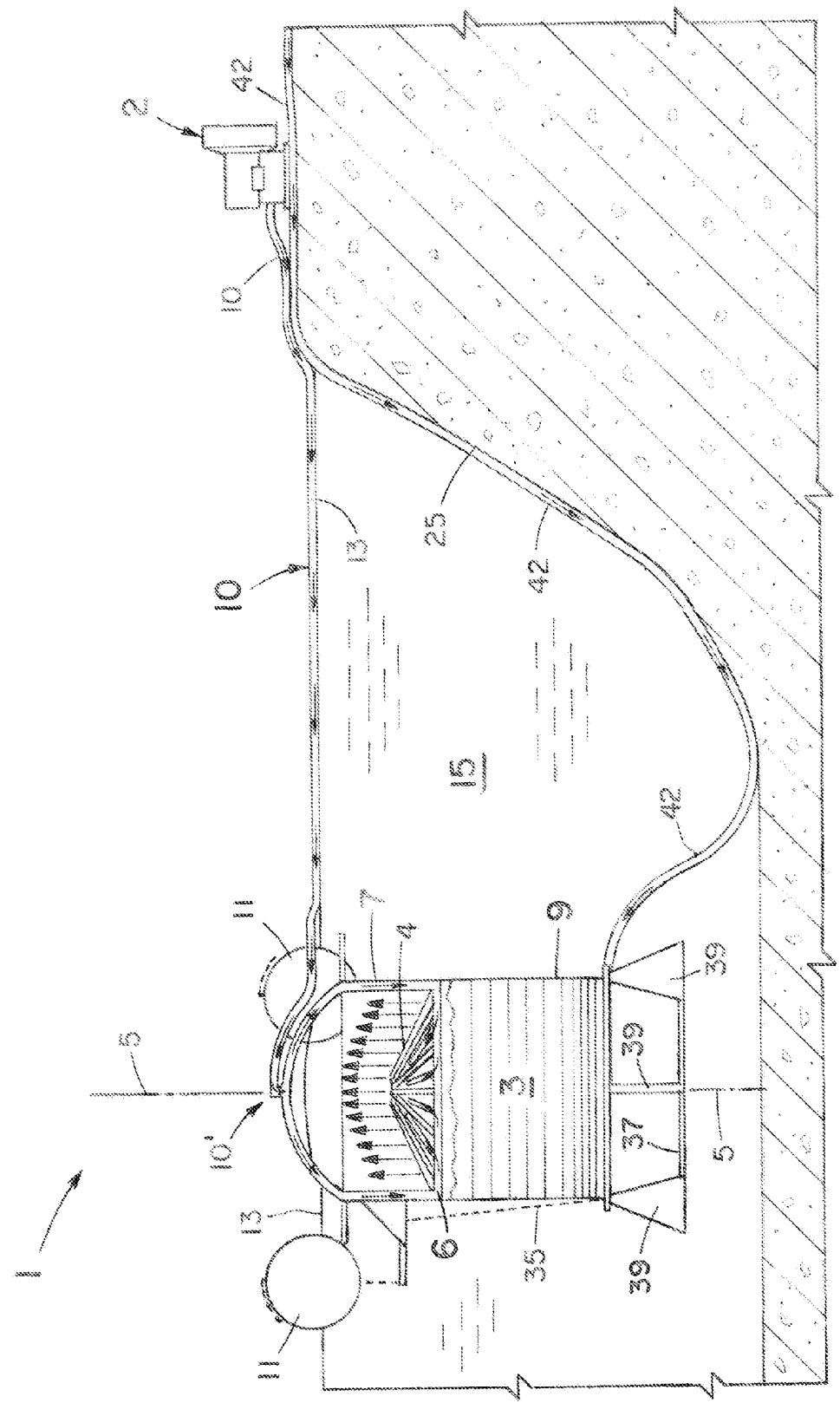
FIG. 1 is a view of the air-powered water circulation system of the present invention.
Figure 2:
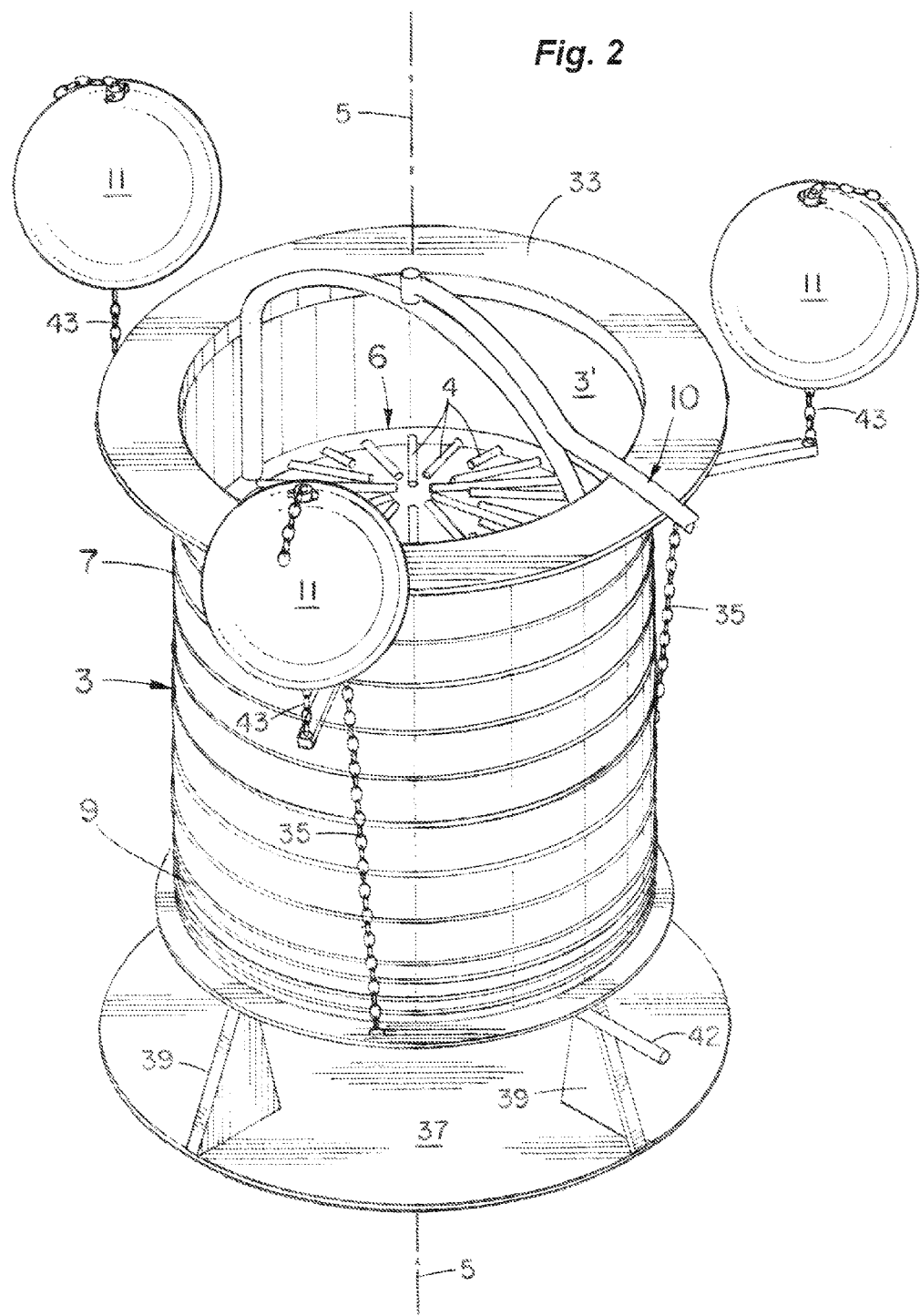
FIG. 2 is a perspective view of the draft tube and flotation arrangement of the system.
Figure 3:
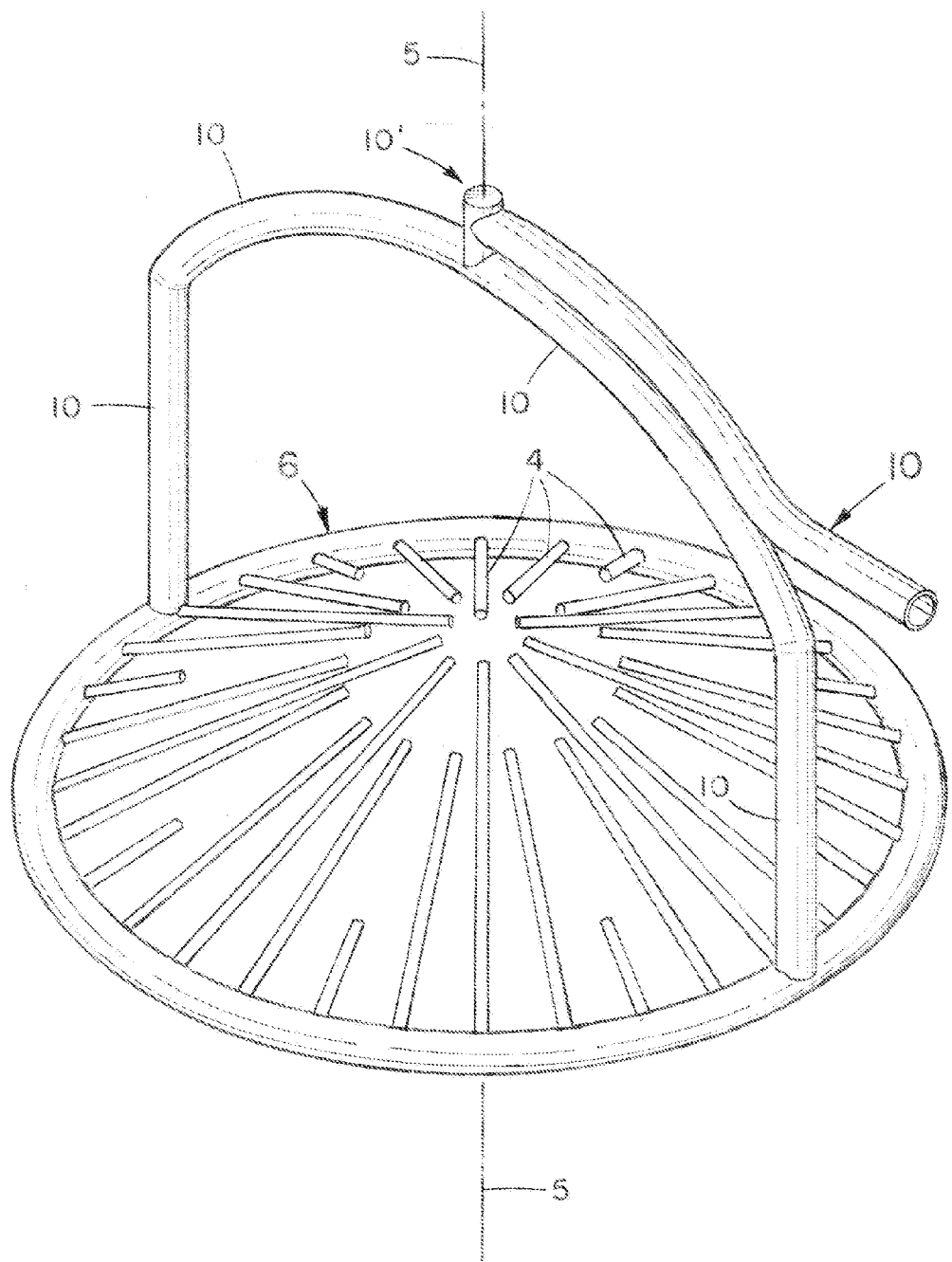
FIG. 3 is a perspective view of the air manifold and air pipes that are positioned within the draft tube of FIG. 2 and the air delivery conduit to the manifold
Figure 4:
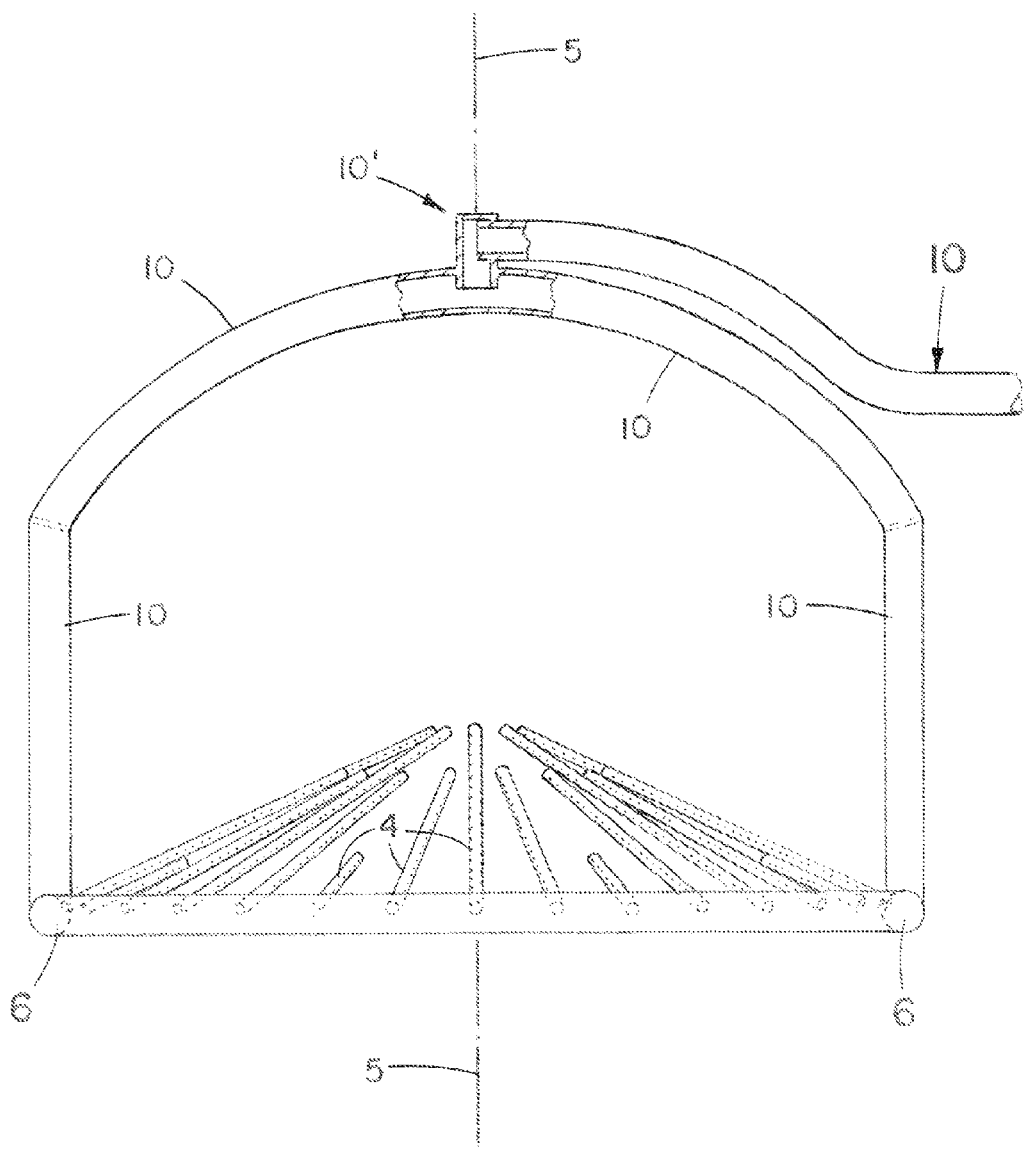
FIG. 4 is a cross-sectional view of the elements of FIG. 3.
Figure 5:
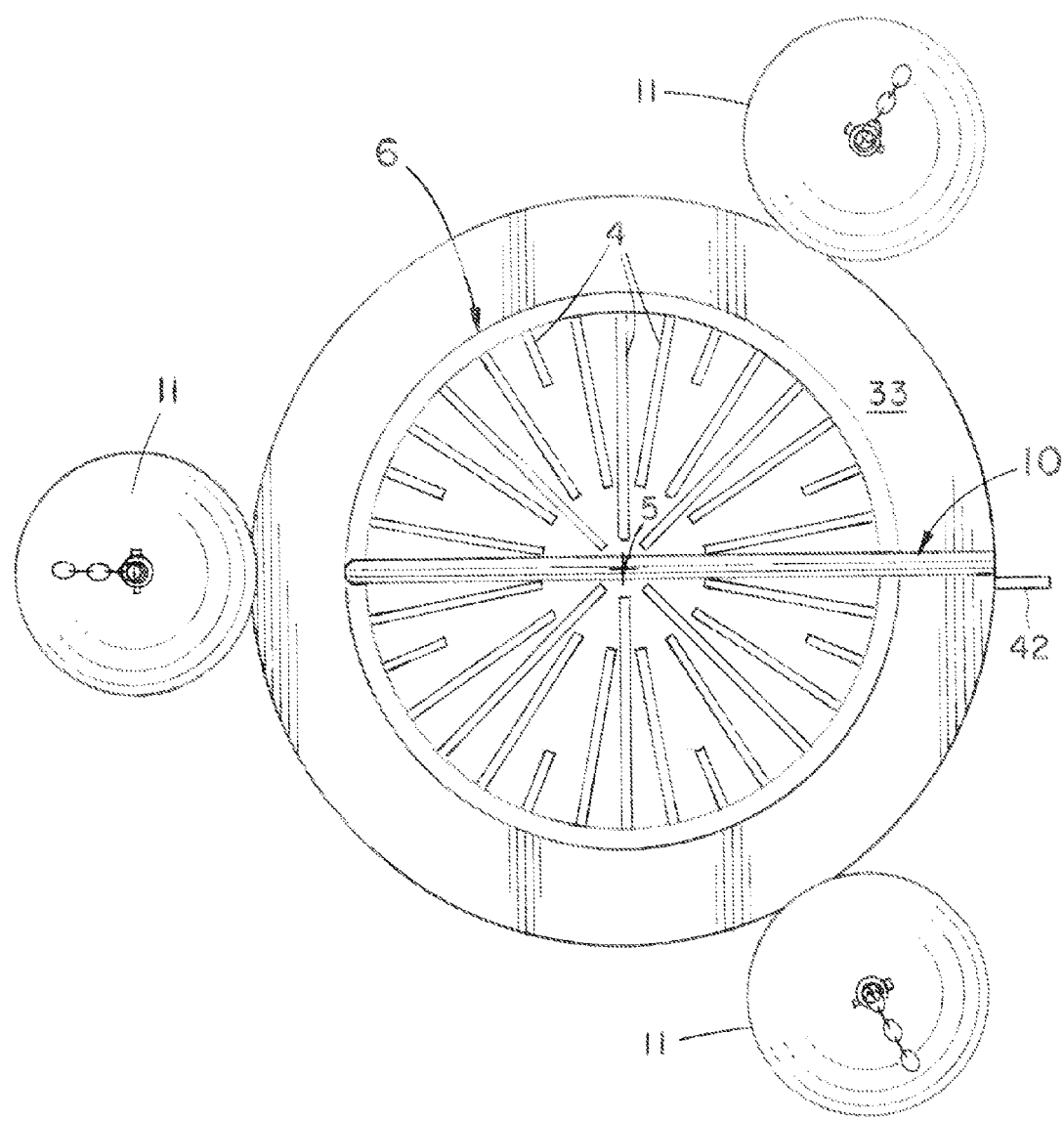
FIG. 5 is a plan view of the elements of FIG. 2.

As shown in FIGS. 1-2, the air-powered water circulation system 1 of the present invention includes a draft tube 3 extending along and about a substantially vertical axis 5 (FIG. 2) between upper and lower end portions 7 and 9. The draft tube 3 is supported by a flotation arrangement including floats 11 that preferably positions and supports the upper end portion 7 of the draft tube 3 adjacent and slightly below the surface 13 of the body of water 15. A pneumatic, air flow arrangement is then provided to supply pressurized air above ambient from the air pump 2 (e.g., fan or blower) in FIG. 1 to a plurality of submerged air pipes 4 positioned within the draft tube 3 below the upper end portion 7 of the draft tube 3 (see also FIG. 3).

The air pipes 4 as shown in FIGS. 1-5 extend inwardly from a submerged manifold 6 (FIGS. 1-3) toward the interior of the draft tube 3 and the vertical axis 5. The submerged air manifold 6 in this regard extends substantially horizontally about the vertical axis 5 (FIG. 1) adjacent the cylindrical inner surface 3' (FIG. 2) of the draft tube 3. The air manifold 6 is in fluid communication with the air pump 2 (FIG. 1) via the air delivery conduit 10. In operation, pressurized air above ambient is then supplied from the air pump 2 through the air delivery conduit 10 (FIG. 1) to the submerged air manifold 6 and into the submerged air pipes 4.

Figure 6:
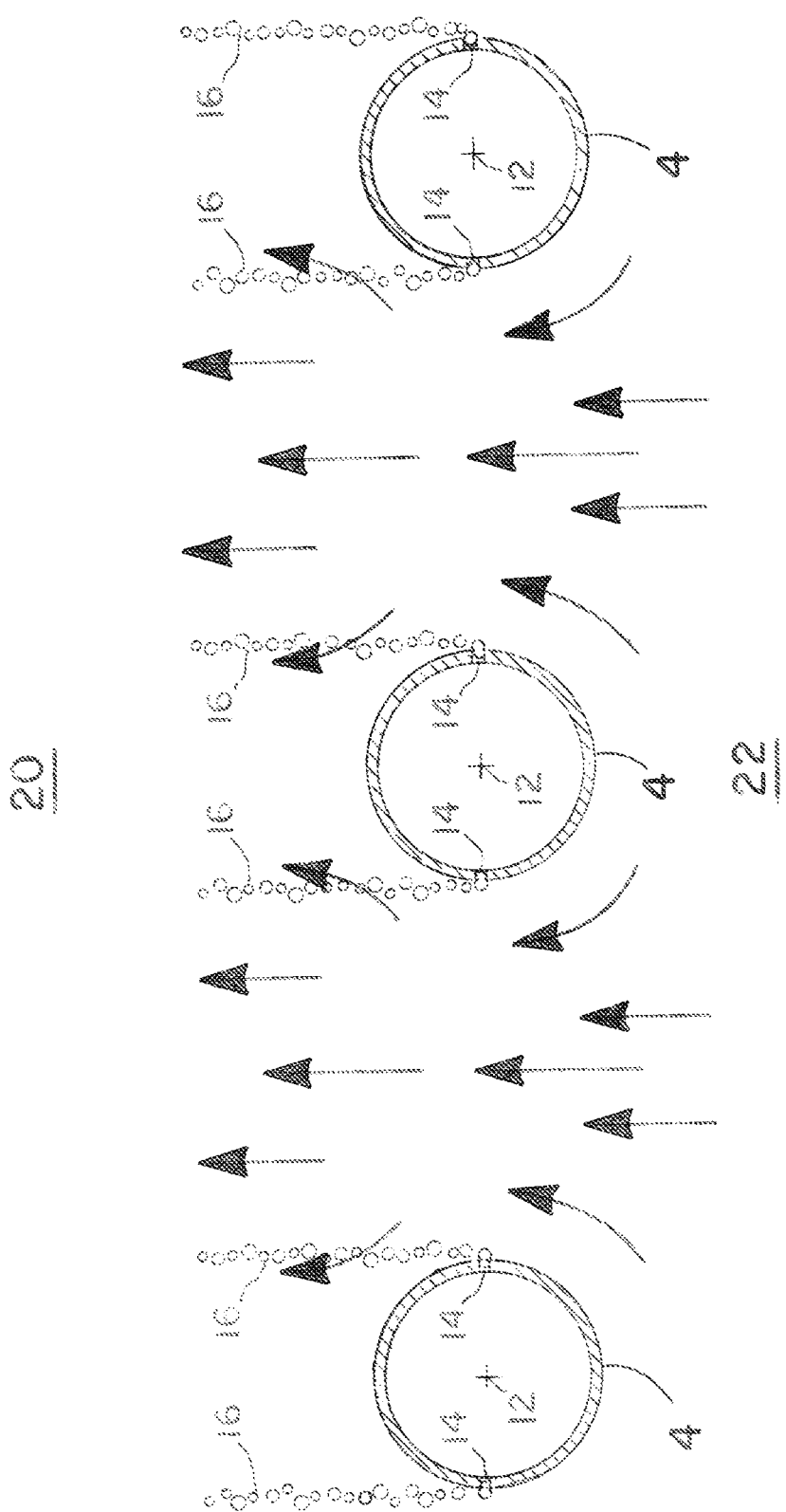
FIG. 6 is a view of the air pipes in operation with pressurized air being discharged from them creating air bubbles in the surrounding water.
Figure 7:
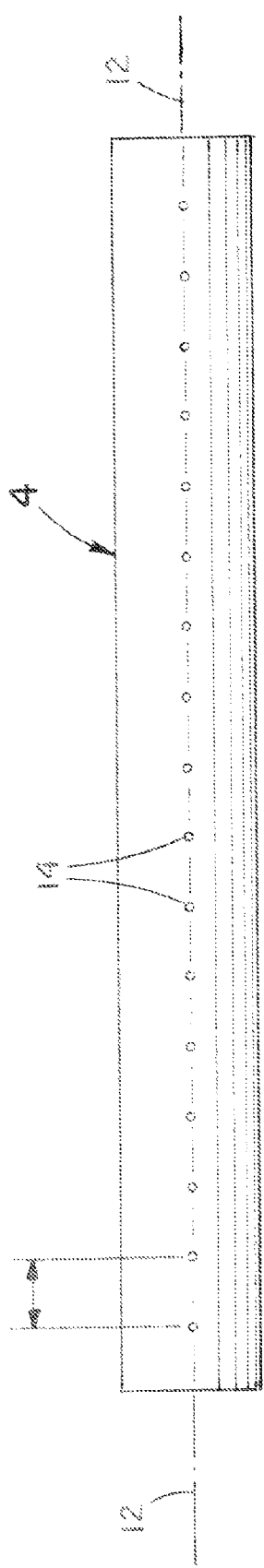
FIG. 7 is a side view of one of the air pipes of FIG. 6.
Figure 8:
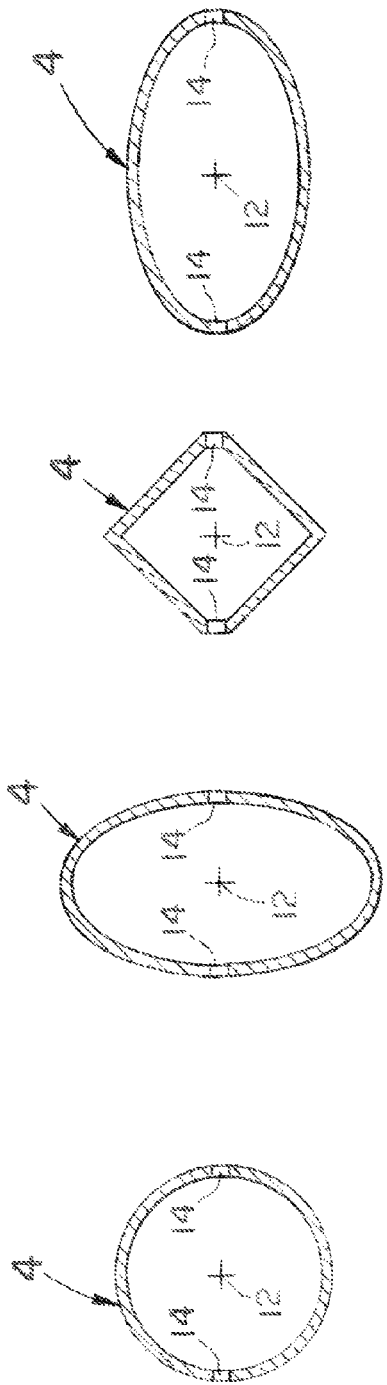
FIG. 8 illustrates a variety of cross-sectional shapes the air pipes can have.

The submerged air pipes 4 are preferably linear tubes respectively extending along and about axes 12 as shown in FIGS. 6-7. Each air pipe 4 preferably has two series of discharge holes 14 extending along the respective axes 12 (FIG. 7) with each series spaced substantially 180 degrees from each other about the axes 12 as in FIG. 6. The respective series of discharge holes 14 in adjacent air pipes preferably face one another as in FIG. 6 to create a venturi effect therebetween. The cross sections of the air pipes 4 as illustrated in FIG. 8 can be a variety of shapes as desired including circular, elliptical, and diamond.

Figure 9:
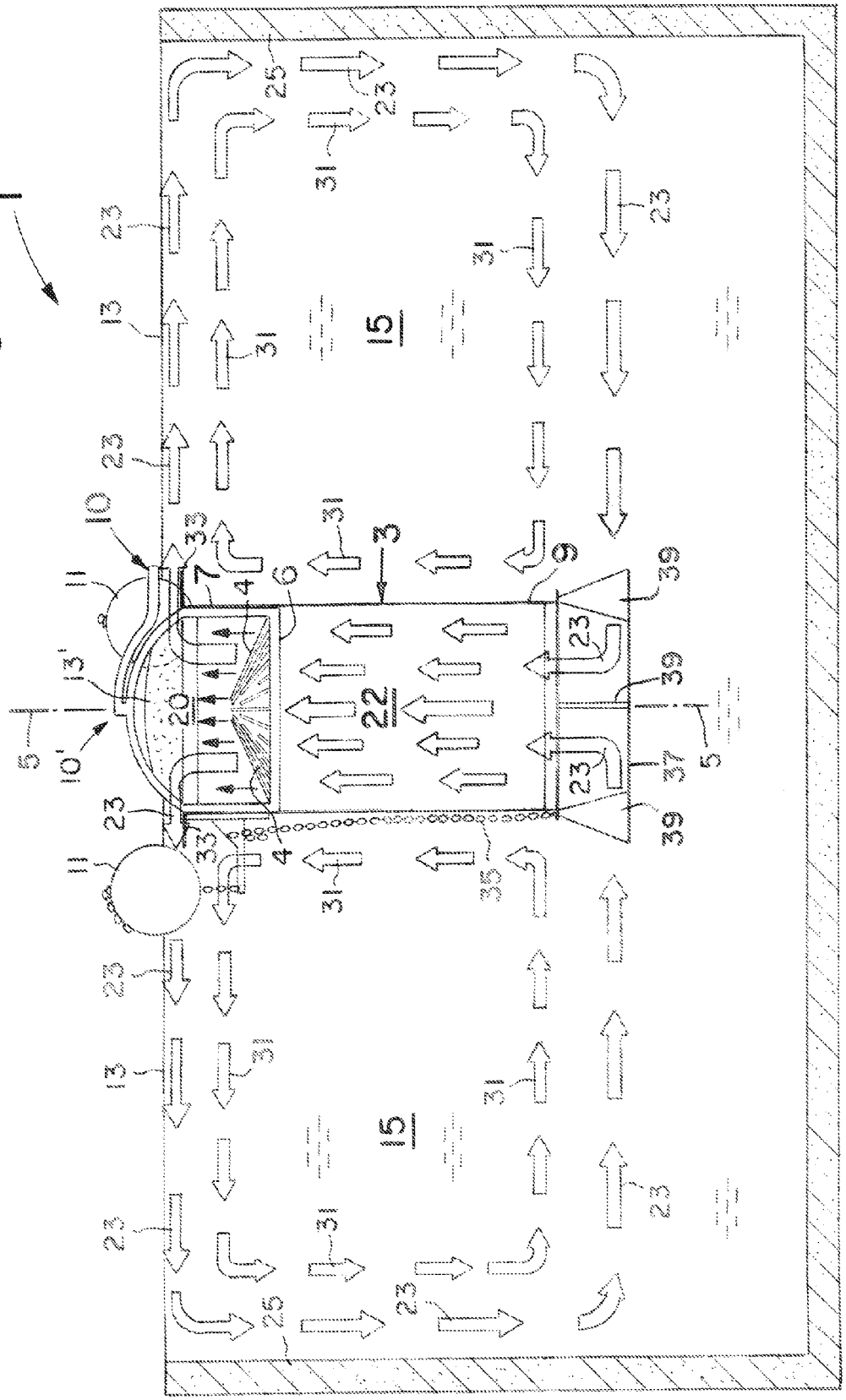
FIG. 9 illustrates the air-powered water circulation system of the present invention in operation and the water circulations patterns it creates and maintains in the body of water
Figure 10:
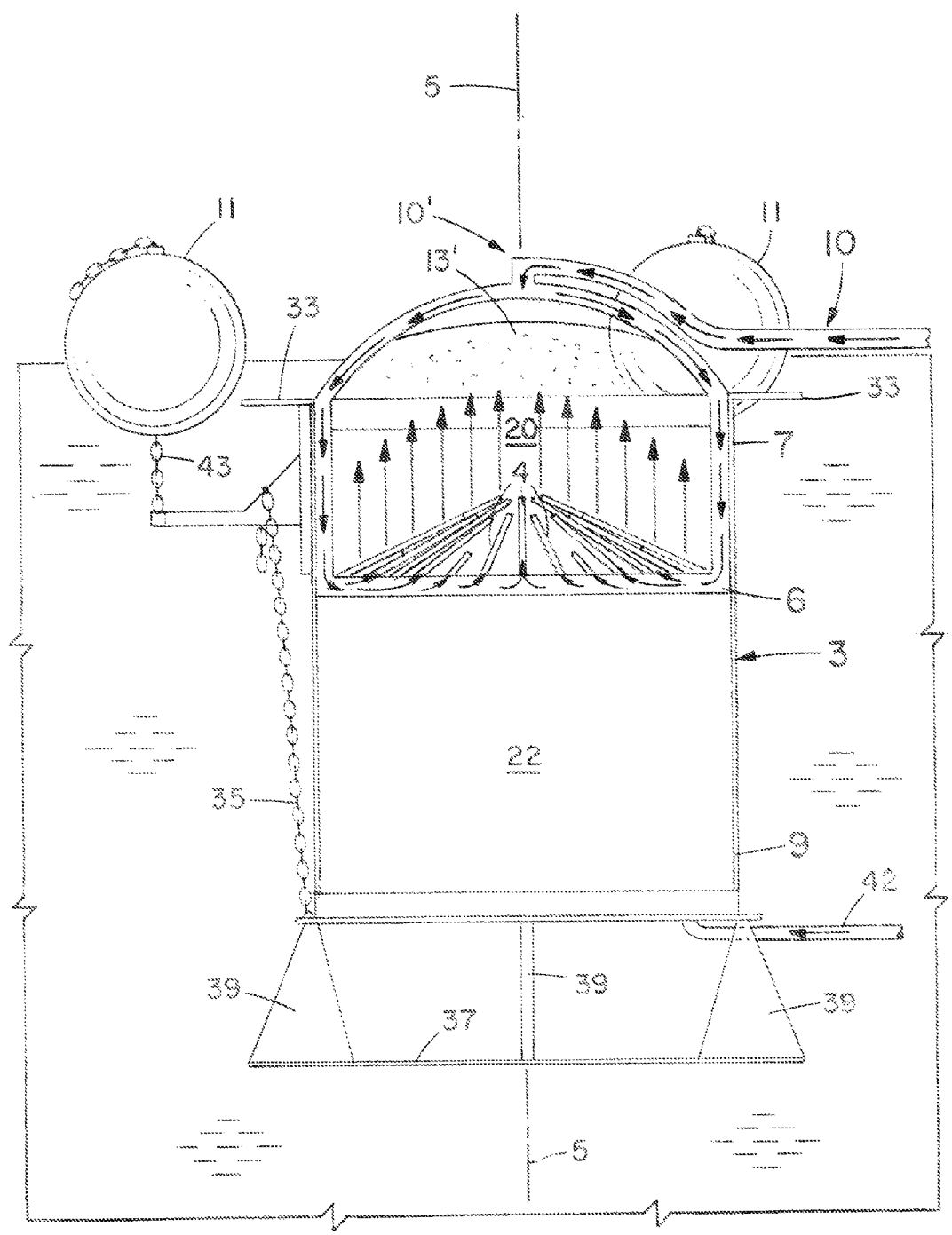
FIG. 10 is an enlarged view of the draft tube, flotation arrangement, air delivery conduit, and submerged air manifold and air pipes of the system.

In operation as indicated above, pressurized air above ambient is supplied to the submerged air pipes 4 from the air pump 2 (FIG. 1) via the air delivery conduit 10 and submerged air manifold 6. The pressurized air is then discharged from the submerged air pipes 4 through the discharge holes 14 of FIG. 6 to create bubbles 16 (FIG. 6) in the water in the interior of the draft tube 3 (FIGS. 9-10). The bubbles reduce the density of the water in a first zone 20 (FIG. 9-10) adjacent to and above the respective air pipes 4 and extending to the surface 13 of the body of water 15. Denser and higher pressure water in a second zone 22 in FIGS. 9-10 below the first zone 20 of water then moves upwardly through the draft tube 3 from the lower end portion 9 thereof toward the first zone 20. In doing so, the rising water passes by the submerged air pipes 4 reducing the density of this water which is rising from the lower, second zone 22 to displace the water in the first zone 20.

This water movement creates an overall circulation pattern 23 in the body of water 15 as illustrated in FIG. 9. The overall circulation pattern 23 as shown passes up through the draft tube 3 from the lower end portion 9 thereof to the upper end portion 7, substantially radially outwardly of the upper end portion 7 substantially about the vertical axis 5 toward the sides 25 of the body of water 15, downwardly adjacent the sides 25 of the body of water 15, and substantially radially inwardly and into the lower end portion 9 of the draft tube 3. This overall, outer or primary circulation 23 of FIG. 9 in turn creates an induced, inner or secondary circulation pattern 31 within it. Together, these nearly laminar, circulation patterns 23 and 31 of FIG. 9 preferably extend 360 degrees about the vertical axis 5 to thoroughly and completely mix and circulate the water in the body of water 15 whether the water is in a tank or an open air environment such as a pond or lake.

Figure 11:
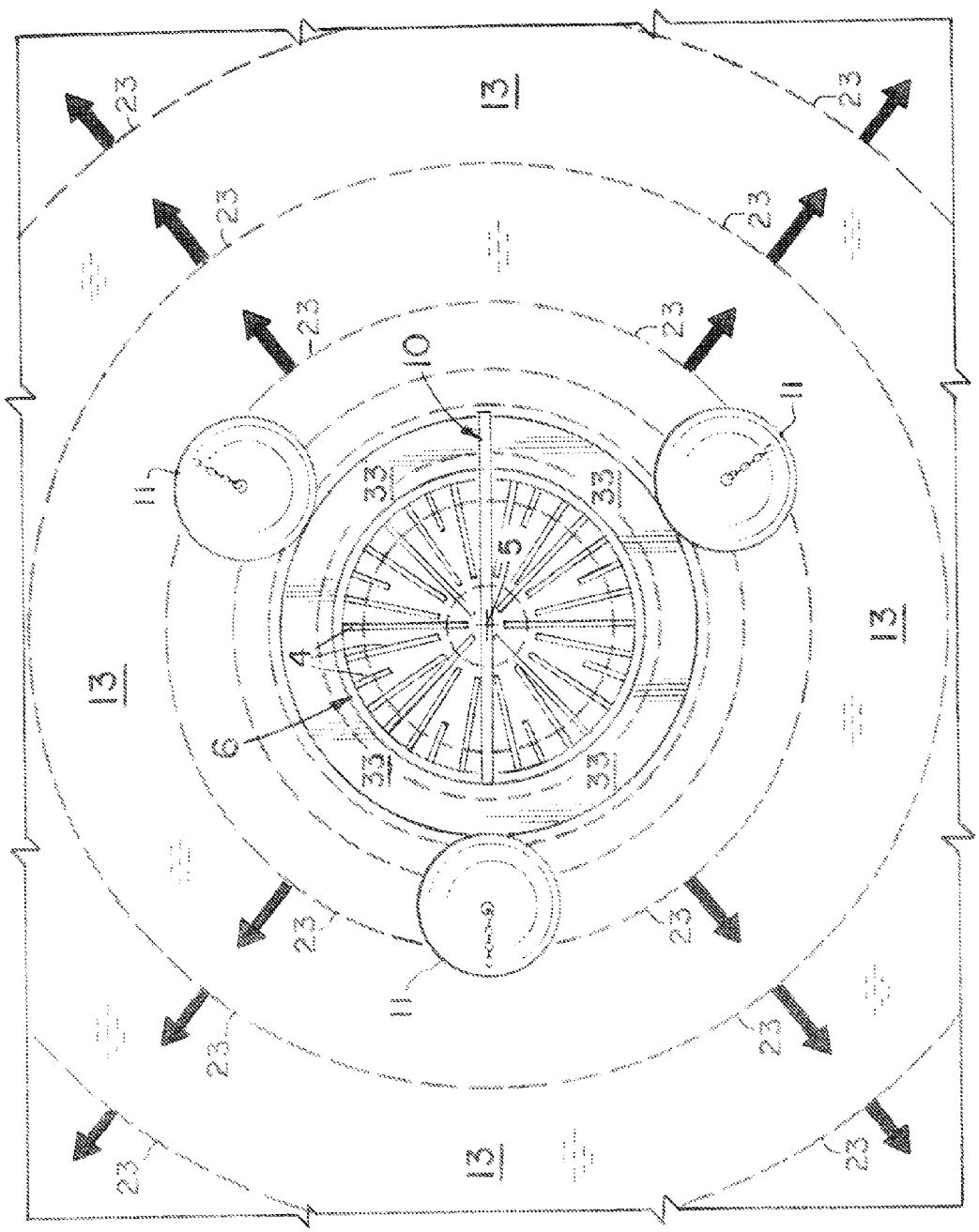
FIG. 11 is a plan view taken along line 11-11 of FIG. 9 illustrating the nearly laminar flow created by the system flowing radially outwardly of the upper end portion of the draft tube.

In creating these circulation patterns 23 and 31, the provision of a lip 33 extending about and several inches (e.g. 4-8) outwardly of the upper end portion 7 of the draft tube 3 in FIGS. 2 and 9 has been found to be most helpful. The lip 33 in this regard is preferably positioned several inches below the water surface 13. In operation, the lip 33 helps to guide and direct the water being discharged from the upper end portion 7 in FIG. 9 outwardly adjacent the water surface 13 toward and to the sides 25 of the body of water 15. This lip 33 works in combination with the natural rising and falling of the small mound of water 13' (see FIG. 10) that is created at the water surface 13 adjacent the vertical axis 5 to aid in creating the nearly laminar flow of FIG. 11 outwardly of the vertical axis 5 adjacent the water surface 13.

Figure 12:
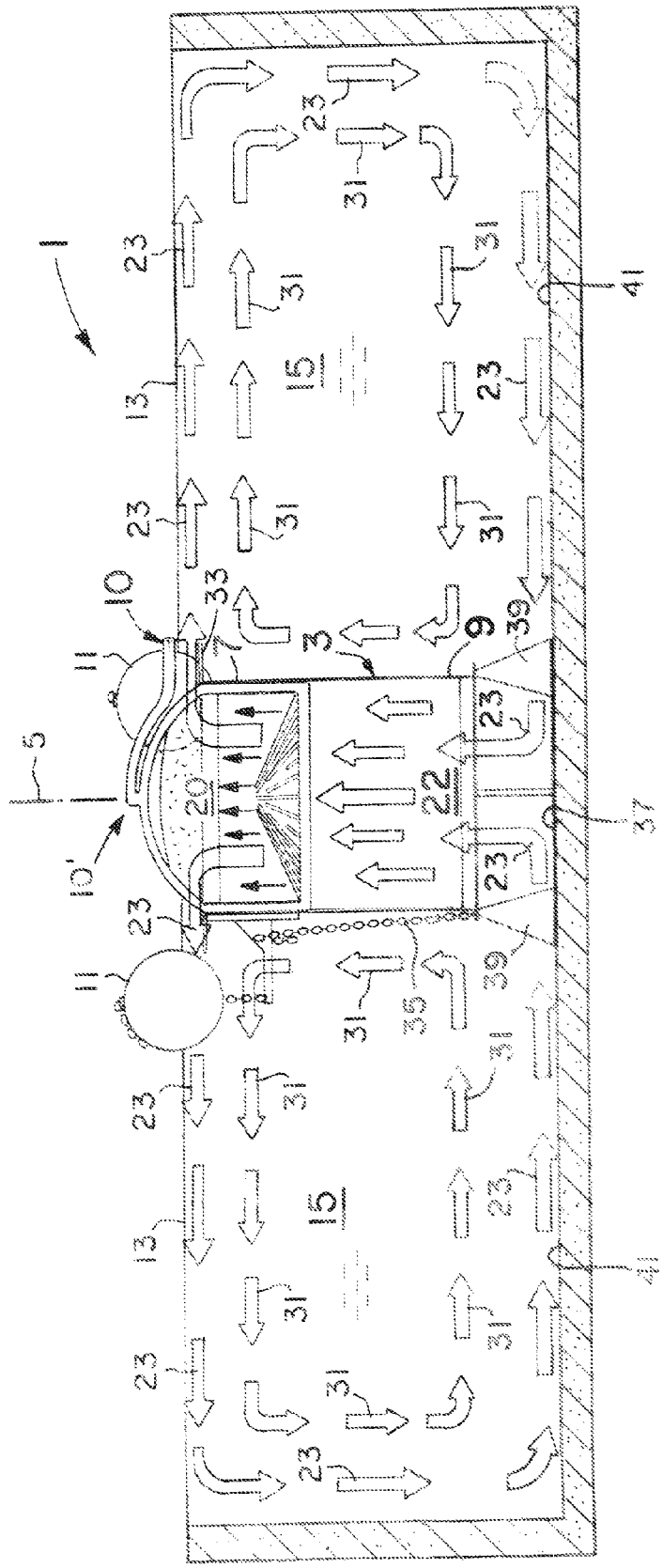
FIG. 12 is a view similar to FIG. 9 but with the inlet arrangement for the lower end portion of the draft tube resting on the bottom of the water tank.
Figure 13:
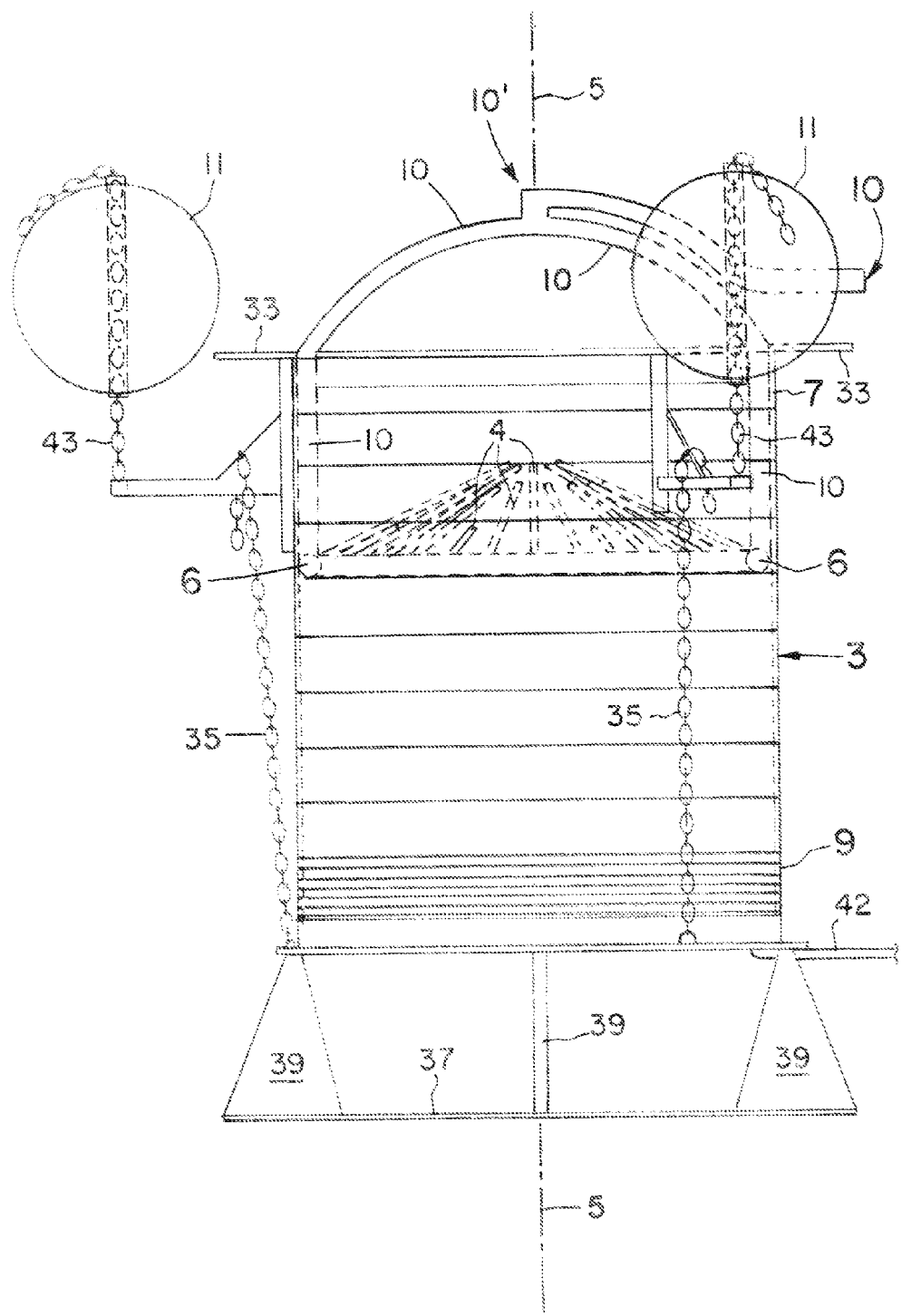
FIG. 13 is an enlarged, perspective view of the lower end portion of the draft tube and the inlet arrangement to it.
Figure 14:
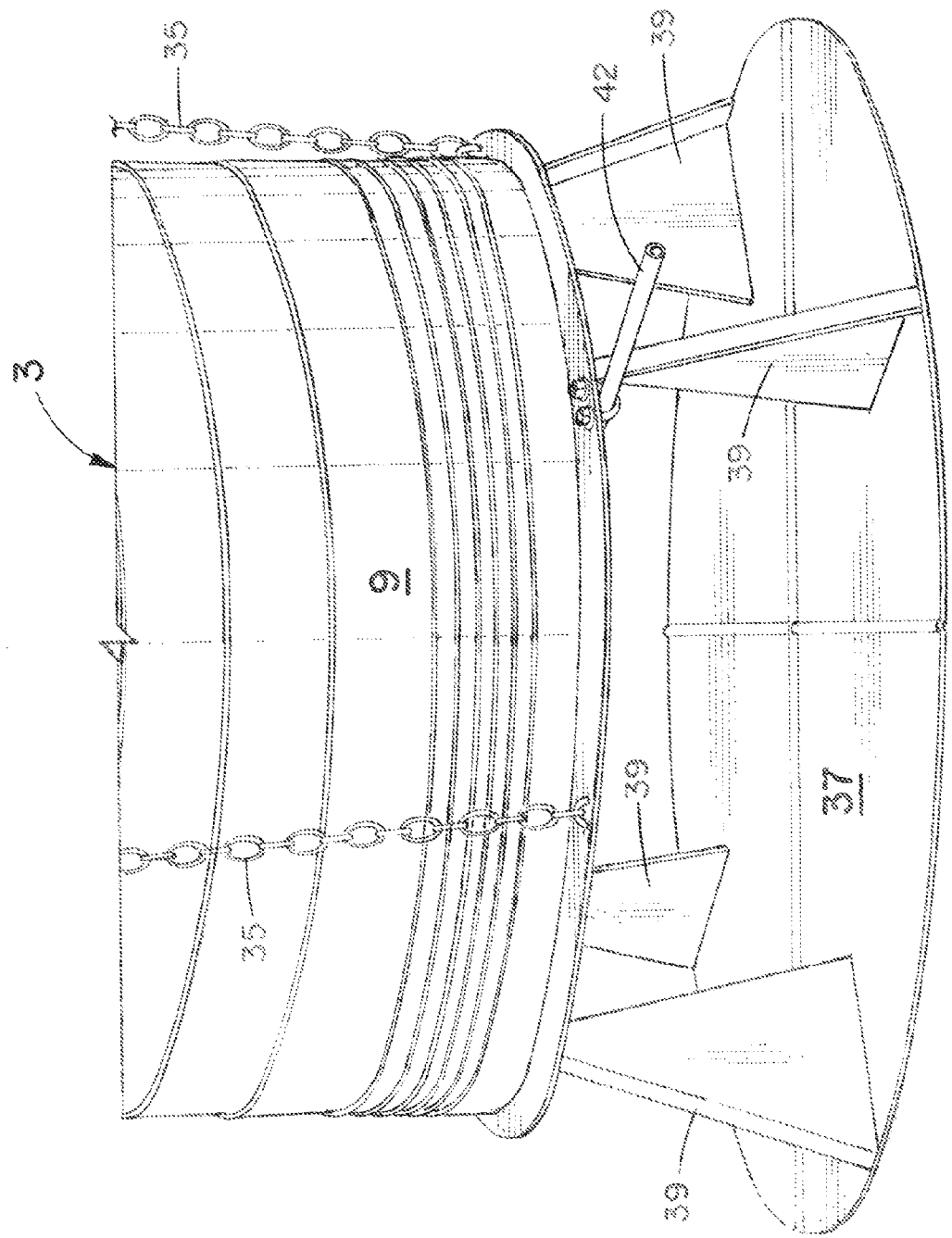
FIG. 14 is a partial cross-sectional view of the draft tube and the arrangements for adjusting the depth of the upper end section of the draft tube and its length.

The draft tube 3 is collapsible and expandable (compare FIGS. 9, 10, and 12) by adjusting the lengths of the chains 35 (see also FIG. 13). The draft tube 3 can also be positioned with the inlet to the lower end portion 9 of the draft tube 3 supported above the bottom 41 of the body of water 15 as in FIG. 9 or on the bottom 41 as in FIG. 12. The inlet arrangement to the lower end portion includes the horizontal plate 37 and spacers 39 as shown in FIG. 14. The horizontal plate 37 in this regard helps to set the inlet depth of the water into the lower end portion 9 of the draft tube 3 and thereby set the depth of the overall, outer circulation pattern 23 in the body of water 15 (compare FIGS. 9 and 12). In this manner, the inlet depth to the draft tube 3 can be set, for example, relatively shallow as in FIG. 9 above any thermoclines to allow for blue-green algae control or at deeper anoxic depths as in FIG. 12 to increase oxygenation and gassing off of undesirable gases (e.g., hydrogen sulfide) in the water as it is brought up from adjacent the bottom 41 of the body of water 15 to the atmosphere at the water surface 13.

Regardless of the expanded or collapsed extent of the draft tube 3 and the depth of the overall, outer circulation pattern 23 in the body of water 15, the air manifold 6 is preferably always set and supported at a predetermined distance below the surface 13 of the body of water 15 by the flotation arrangement including the floats 11. This distance can be set as desired by adjusting the lengths of the chains 43 in FIGS. 2, 10 and 13 that pass through the floats 11 and then pinning the respective chains 43 at 45 (FIG. 15) at the desired length. It is noted that the lack of motors and moving parts and their weight to generate the flow through the draft tube 3 results in the floats 11 needing to support only about 50-200 pounds depending mostly on the size of the draft tube 3 being used (e.g., 16-36 inch diameter).

Empirically, it has been found that setting and maintaining the manifold 6 at 1-5 feet and preferably 2-4 feet below the surface 13 of the body of water creates the most efficient overall operation of the air-powered water circulation system 1 of the present invention. This is in contrast to aerators set at or near the bottom of the body of water (e.g., 35 feet) requiring high horsepower air pumps (e.g., 10-50 hp) to overcome the water pressure (e.g., 15 psi above atmosphere) at such depths. That is and as the submergence depth decreases, the head pressure resisting the incoming air flow decreases proportionally. Consequently, a relatively low horsepower air pump (e.g., 0.5 to 1.5 hp) can be used in the circulation system 1 of the present invention to supply the relatively low, pressurized air (e.g., 1-4 psi above ambient) to the submerged air manifold 6 and submerged air pipes 4. Yet, a relatively high flow rate of water can be created (e.g., 600-700 gallons per minute in a 16 inch diameter draft tube using an 0.5 horsepower air pump generating 15 cubic feet per minute of air flow at 1-4 psi up to, for further example, 1700-3000 gallons per minute in a three foot diameter draft tube 3 using a 1.5 horsepower air pump generating 36 cubic feet per minute of air flow at 1-2 psi above ambient). Such high flows are possible while still creating and maintaining the nearly laminar, circulation patterns 23 and 31 throughout the entire body of water 15 (e.g., 8-100 million gallons over ¼ to 25 acres). Further, the power consumption remains relatively low (e.g., 10 amps for an 0.5 horsepower air pump to 25 amps for a 1.5 horsepower air pump) in addition to the noise level also remaining relatively low.

In this manner and by setting and maintaining the air manifold 6 at a predetermined depth below the water surface 13, the circulation system 1 can be designed with a given and substantially constant head pressure to overcome regardless of fluctuations in the overall depth of the body of water 15. This is in contrast to aerators that are set at the bottom of a fluctuating body of water in which the head pressure to overcome can vary significantly over time. Additionally, the relatively shallow submergence of the air manifold 6 and relatively low head pressure result in reduced air entrainment in the water versus deeper aerators. Air in this regard is more compressible than water and deeper aerators at higher head pressures can result in high concentrations of entrained air nearing air saturation in the water. Such high concentrations can then create cavitation, water hammer, and other undesirable conditions in the water and adversely affect the desired circulation patterns and overall operation of the system.

The pressurized air passing from the air pump 2 of FIG. 1 to the submerged manifold 6 and discharged as bubbles 16 in FIG. 6 from the submerged air pipes 4 as discussed above is the sole motive force in the preferred embodiment for creating and maintaining the overall primary and secondary water circulation patterns 23 and 31 of FIGS. 9 and 12. This offers numerous operating and safety advantages over other systems as also discussed above. Further, the air bubbles in addition to providing the motive force also serve to treat the circulating water by adding oxygen to the water to accelerate the biological and solar processes that clean up the water. The resulting cleansing is particularly desirable as it relates to controlling or removing phosphorus, acidity, suspended solids, and volatile disinfectant byproducts.

The operation of the air bubbles to volatize disinfectant byproducts by air stripping is particularly desirable in potable bodies of water such as municipal and other water sources intended for drinking that are initially treated with disinfectants such as chlorine and chloramines. These disinfectants very efficiently and effectively eliminate harmful agents in the water making the water potable and suitable for drinking. However, such disinfectants create undesirable disinfectant byproducts such as chloroform, bromodichloromethane, dibromochloromethane, and bromoform which are all forms of trihalomethanes (THM's). In very small amounts (e.g., very low parts per billion), these THM's are not believed to be a serious threat to health but reduction of them in potable water reservoirs such as municipal water tanks is always desirable. It is noted that the water in both the primary circulation pattern 23 and the induced secondary circulation pattern 31 that does not initially pass through the treatment zone 20 above the air manifold 6 in the draft tube 3 is nevertheless mixed or blended with water that did pass through the treatment zone 20. In this manner and over time (e.g., several hours or days depending on the size of the body of water), virtually all of the water in the body of water 15 (e.g., 8-100 million gallons over ¼ to 25 acres) will be treated/diluted to eventually reduce the undesirable disinfectant byproducts to an acceptable level. The thorough mixing and blending of the water also simplify water testing as a sample or samples can be taken virtually anywhere in the body of water 15 and will accurately reflect the condition of the water in the entire body of water 15.

The relatively shallow setting (2-4 feet) of the air manifold 6 below the surface 13 of the body of water 15 not only reduces the energy costs to produce the relatively low pressurized air needed to operate the circulation system 1 as discussed above but also increases the efficiency of the treatment of the water. This is the case as the bubbles from the submerged air pipes 4 essentially do all the treating they are going to do and become saturated with the disinfectant byproducts in this relatively small vertical distance (e.g., 2-4 feet). Bubbling air from deeper depths is then not only more expensive but after rising 3 feet or so, it does little or no more effective treating and can leave the higher water essentially untreated. In contrast, the air manifold 6 of the present invention rises and falls with the flotation arrangement to remain at the desirable, relatively shallow depth (e.g., 2-4 feet) regardless of the depth of the water in the body of water 15.

The basic operation of the air stripping is that upon contact with the bubbles, the TMH's in a liquid or aqueous state in the water are volatilized to a gaseous state and taken in by the nitrogen (e.g., 78%) and oxygen (e.g., 21%) inside each air bubble. In this manner, the THM's are stripped out of the water. The air bubble and gaseous THM's inside it then rise to the water surface 13 and escape into the atmosphere above the water surface 13. The nitrogen in the air bubble serves as the main mode of holding the THM's as both THM's and air escape together from the water following exposure to the atmosphere. Oxygen in the air bubble also holds THM's but has a much higher likelihood of becoming soluble in the water. Nitrogen is insoluble in water and will not dissolve back into it like oxygen has a tendency to do. Consequently, as the air bubbles are exposed to THM's in the water, the majority of the THM's are transported out of the water without re-entering by the nitrogen in the air and the THM's are then stripped out of the water. It is noted that it is important to have a system such as the present one with an extendable draft tube 3 that can be set to bring up water from the lowest depths as many undesirable disinfectant byproducts including chloroform have a higher density than water and therefore a greater tendency to concentrate at the lower depths of the body of water.

It has also been empirically determined for an overall efficient operation of the system 1 and in particular the treatment of the undesirable disinfectant byproducts that the discharge holes 14 in the air pipes 4 in FIGS. 6-7 are preferably as small as possible (e.g., 0.040 down to 0.010 inches in diameter). In this manner, bubbles 16 in FIG. 6 with large surface area to volume ratios are created (e.g., ⅛ inch diameter bubbles with surface areas on the order of 0.040 square inches and volumes on the order of 0.0010 cubic inches). Additionally, the spacing of the discharge holes 14 along the air pipes 4 of FIG. 7 is preferably on the order of 0.25 inches so that the bubbles do not fuse or merge into larger bubbles with lower surface area to volume ratios (e.g., merge into ½ inch diameter bubbles with surface areas on the order of 0.785 square inches and volumes on the order of 0.0655 cubic inches). In this regard, the ½ inch diameter bubble 47 in FIG. 16 with a surface area on the order of 0.785 square inches is equivalent in volume to 64 of the ⅛ inch diameter bubbles 16 which have a cumulative surface area on the order of 3.1425 square inches for the same volume of about 0.0655 cubic inches. The spacing between the air pipes 4 in FIG. 6 of about 1.5 inches has also been found to be desirable with 0.375-2 inch diameter pipes having a wall thickness on the order of 0.02 to 0.125 inches. The water to air ratio in the first zone 20 treating the undesirable disinfectant byproducts can vary as desired but is typically on the order of 6-10 parts water to 1 part air for efficient treatment and overall operation of the water circulation system 1.

The air pipes 4 in the array of the preferred embodiment as shown in FIGS. 1-5 extend substantially radially inwardly and upwardly from the manifold 6 into the interior of the draft tube 3 substantially in a conical fashion (e.g., truncated cone). The manifold 6 is preferably supported to extend horizontally about the vertical axis 5 and the air pipes 4 extend upwardly from the manifold 6 and the horizontal substantially between 15 and 45 degrees and more preferably about 25-30 degrees. Too much inclination can undesirably result in excessive differences in air discharge from the pipes 4 caused by too great a pressure differential along the air pipes 4. This to a certain extent is overcome in the conical array of pipes 4 of different lengths (e.g., 4, 12, and 16 inches in a three foot diameter draft tube 3 with the 16 inch pipes extending upwardly about 12 inches) by keeping the shortest and middle lengths fairly small. Reducing the spacing of the discharge holes 14 closer to the air manifold 6 in the middle and longest pipes 4 can also address this problem. The air pipes 4 as mentioned above are preferably linear tubes closed at their outer ends and additionally extend inwardly of the manifold 6 for these different distances. The different lengths of the air pipes 4 in this array and their positioning relative to each other as in FIGS. 3 and 5 also serve to create a non-uniform spacing pattern that forms a plurality of differently shaped and sized gaps between and among the air pipes 4.

In this manner and with the upward force of the water through the draft tube 3, most trash such as plastic and paper bags and other debris in the water will pass up through the array of pipes 4 and not hang up on the pipes 4 and become clogged. In some cases, the debris may initially hang up in the array of pipes 4 but in relatively short order, most of this debris will move around and upwardly along the inclined pipes 4 and pass by the array. This operation is also aided by closing the pipes 4 with internal plugs (versus external caps that may undesirably snag passing debris) and by not extending the pipes 4 completely across the manifold 6 and interior of the draft tube 3. Consequently, a central gap is created about the vertical axis 5 where the upward velocity of the water is greatest and where some debris is naturally directed by the upward and inward inclination of the pipes 4 toward the vertical axis 5. It is noted that the largest gaps are preferably adjacent the inner cylindrical surface of the draft tube 3 where the water velocities tend to be the smallest. In any event, this self-cleaning and non-clogging feature of the present invention is aided in occurring because there are few and no moving parts in the draft tube 3 as in other systems which are prone to being damaged by such debris or bound up as by fishing line in the debris.

Figure 17:
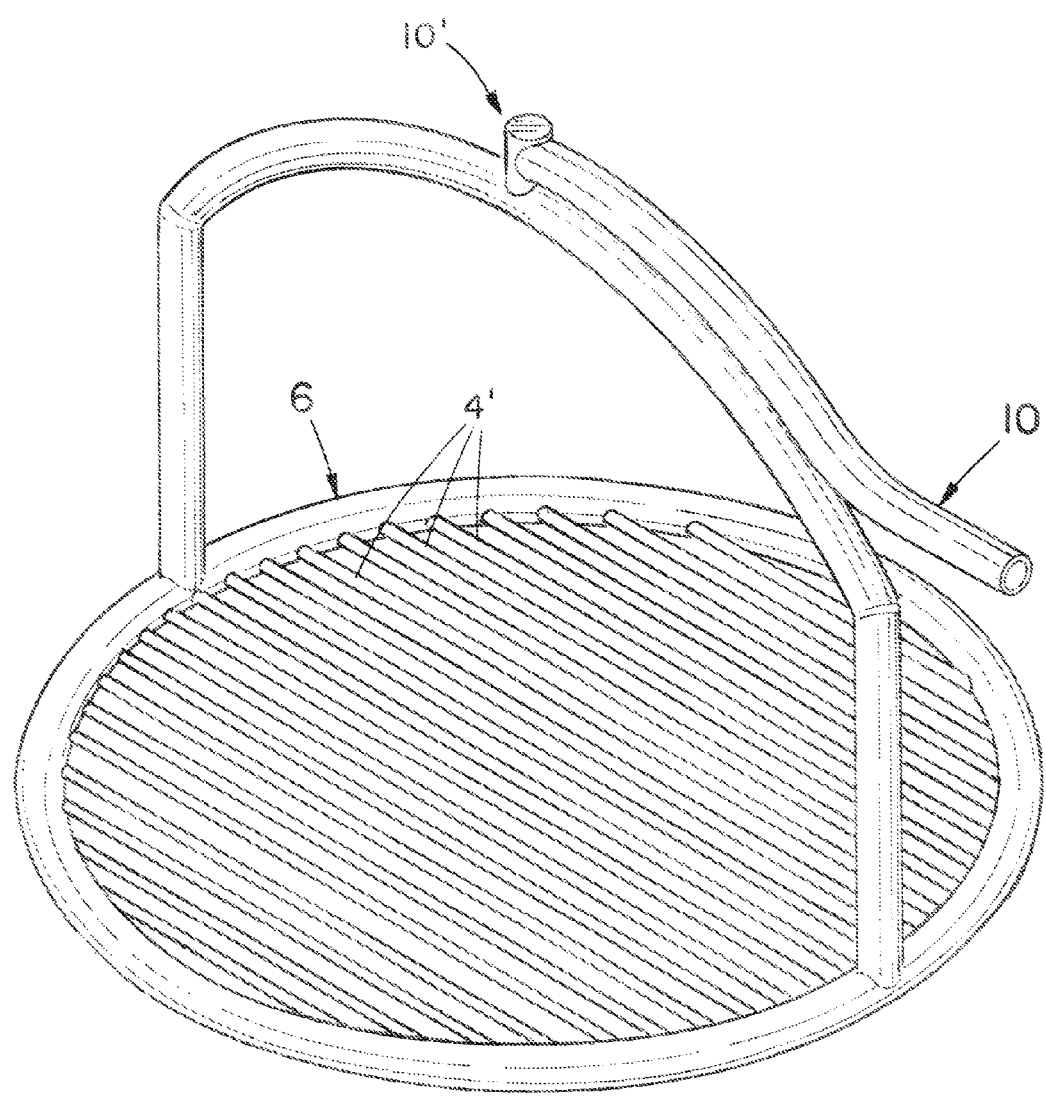
FIGS. 17 and 18 are views of an alternate array of air pipes with the pipes extending in a substantially parallel fashion across the air manifold.
Figure 18:
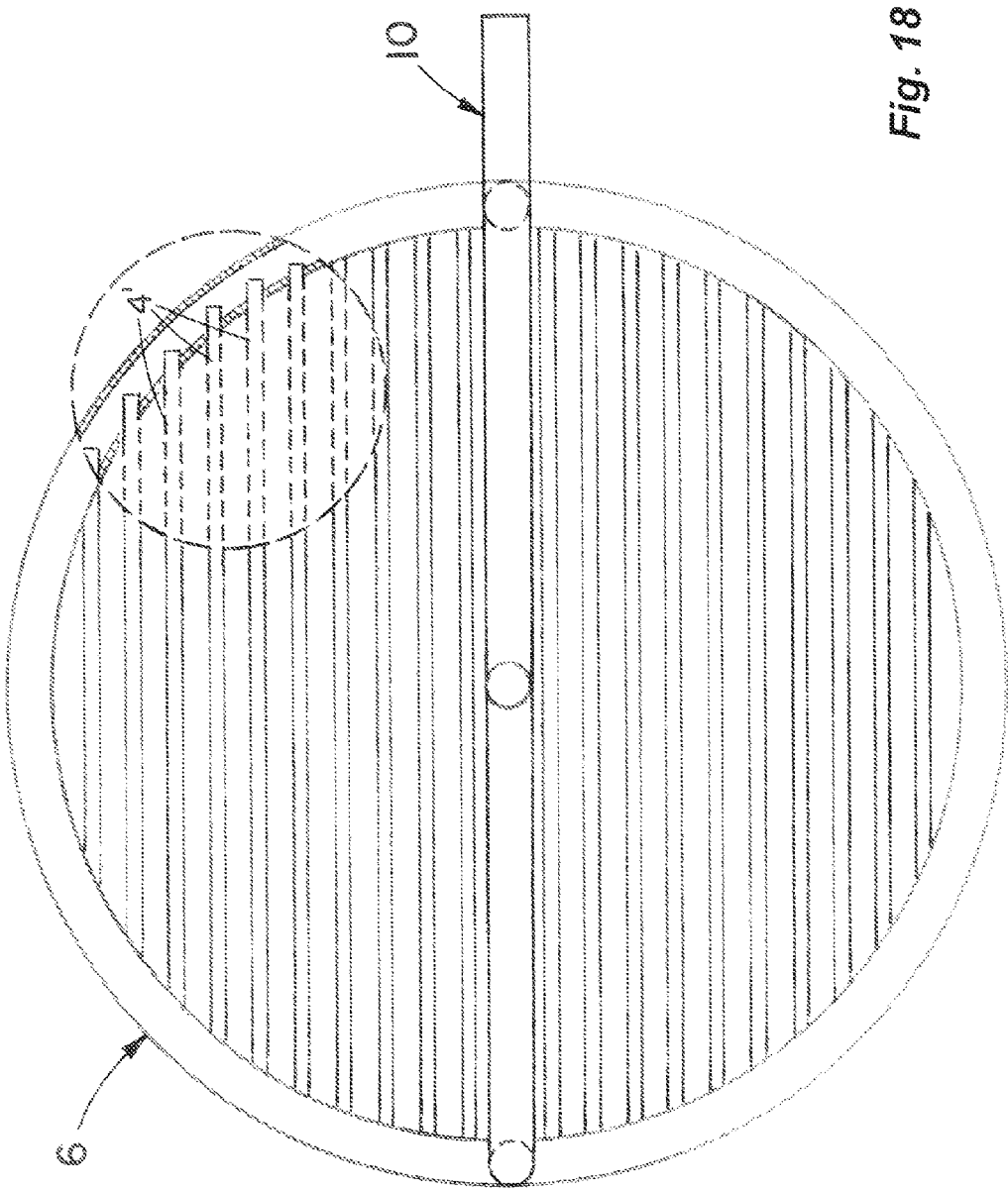

In an alternate design intended primarily for use in bodies of water such as municipal water sources in which debris is normally not a significant problem, the array of pipes 4' shown in FIGS. 17-18 can be used. In it, the air pipes 4' extend in a parallel fashion completely across the manifold 6 and the interior of the draft tube 3. The spacing between the pipes 4' in this array can be non-uniform if desired but uniform spacing as shown is preferred for efficient operation with the pipes 4' extending continuously and horizontally across the manifold 6 as shown.

In both arrays of air pipes 4 and 4', the air conduit 10 in FIG. 1 delivering pressurized air from the air pump 2 to the submerged air manifold 6 upstream of the air pipes has a raised portion at 10' above the water surface 13 adjacent the upper end portion 7 of the draft tube 3. This raised portion 10' serves to form an air trap between the submerged air manifold 6 and the air pump 2 to prevent water from rising from the submerged air manifold 6 past the raised portion 10' toward the air pump 2. This is particularly important when the air pump 2 is turned off or not sufficiently pressurizing the air in the conduit 10 as any water that flows into the conduit 10 between the raised portion 10' and the air pump 2 must first be blown out through the air manifold 6 and air pipes before proper operation of the circulation system 1 of the present invention can be initiated or resumed. Normally, the resistance of the air pump 2 to air flow back through it when it is turned off is sufficient to maintain the air trap to prevent undesirable entry of water into the conduit 10 but a more positive device such as a check valve could be used if desired. For safety and other reasons, the air pump 2 as shown in FIG. 1 is preferably located remotely from the draft tube 3 on land adjacent the sides 25 of the body of water 15.

Figure 19:
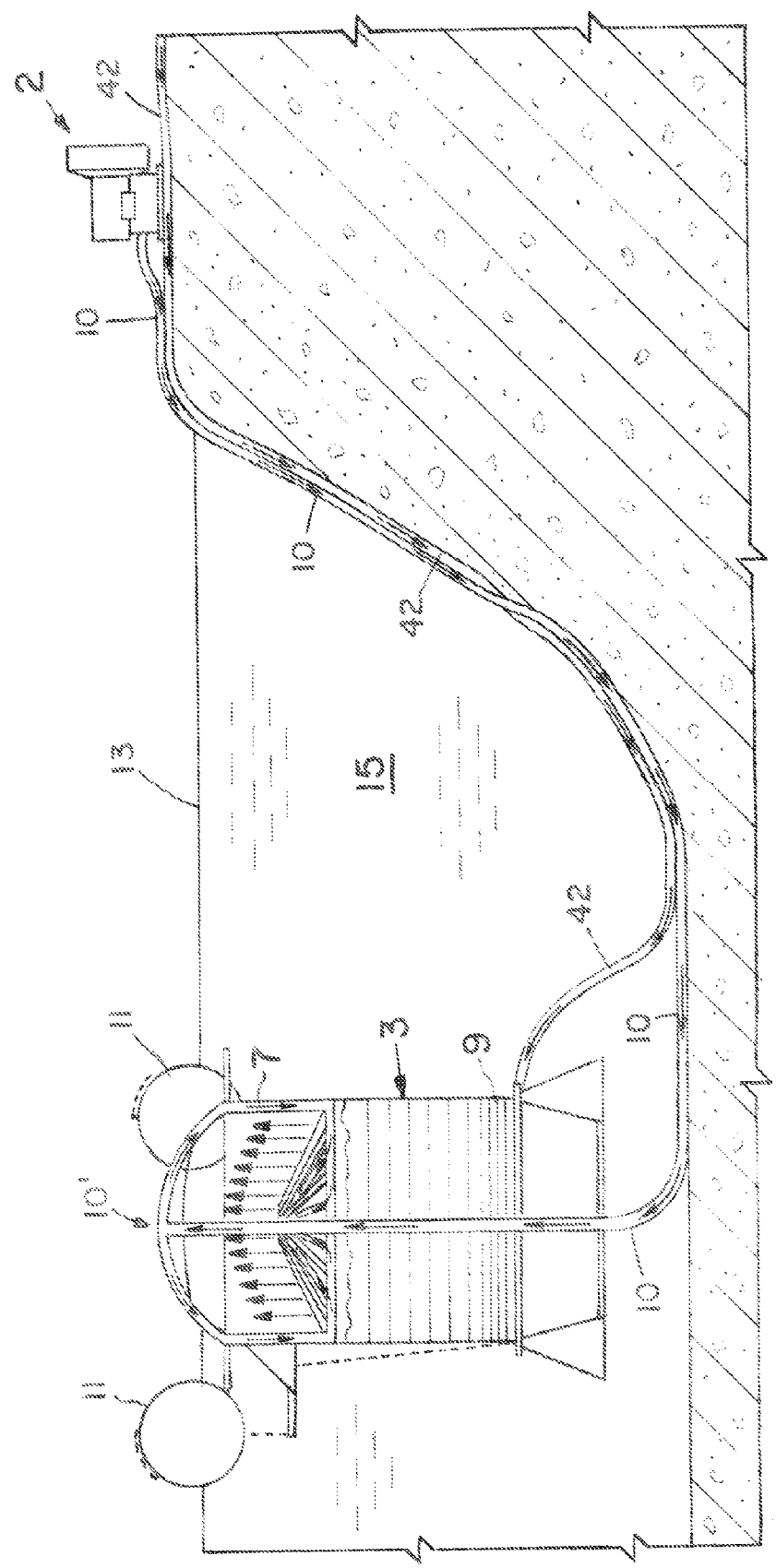
FIG. 19 is a view similar to FIG. 1 but with the air delivery conduit from the air pump submerged adjacent the submerged disinfectant line rather than floating on the water surface.

The potential problem of water entering the air delivery conduit 10 and having to blow it out can be aggravated if the floating conduit 10 of FIG. 1 is submerged between the air pump 2 and the air trap at 40 to reduce its visibility and avoid presenting an obstacle to boats and swimmers. Even a slight submergence (e.g., several feet) let alone a weighted, deep submergence (e.g., substantially along the disinfectant line 42 in FIG. 19 delivering disinfectant to the draft tube 3 adjacent its lower end portion 9) will require the introduction of a significant amount of air pressure into the conduit 10 from the air pump 2 to blow out any such water. In some cases, it may even be too high for the air pump 2 to overcome by itself and may necessitate an undesirable service call. Inclusion of the air trap is therefore a desirable addition.

The above disclosure sets forth a number of embodiments of the present invention described in detail with respect to the accompanying drawings. Those skilled in this art will appreciate that various changes, modifications, other structural arrangements, and other embodiments could be practiced under the teachings of the present invention without departing from the scope of this invention as set forth in the following claims. In particular, it is noted that the word substantially is utilized herein to represent the inherent degree of uncertainty that may be attributed to any quantitative comparison, value, measurement or other representation. This term is also utilized herein to represent the degree by which a quantitative representation may vary from a stated reference without resulting in a change in the basic function of the subject matter involved.

We claim:

1. An air-powered water circulation system for ponds, lakes, municipal water tanks, and other bodies of water having a surface and sides depending downwardly to a bottom, said system including:
   a draft tube extending along and about a substantially vertical axis between upper and lower end portions and having an inner surface extending along and about the vertical axis substantially between said upper and lower end portions,
   a flotation arrangement adjacent the upper end portion of the draft tube and supporting the upper end portion thereof adjacent and below the surface of the body of water,
   a pneumatic, air-flow arrangement for supplying pressurized air above ambient from an air pump to a plurality of submerged air pipes positioned within said draft tube below the upper end portion thereof, said submerged air pipes extending inwardly from a submerged air manifold extending substantially about said vertical axis adjacent the draft tube, said manifold being in fluid communication with said air pump and said air pipes wherein said pressurized air is supplied from the air pump through said manifold to said air pipes,
   said air pipes respectively extending inwardly of said manifold into the interior of the draft tube forming an array of air pipes, said air pipes respectively having at least one series of discharge holes in a first portion thereof extending along the respective first portions of the respective air pipes wherein said pressurized air supplied from said air pump through said manifold into said air pipes passes out of the discharge holes therein to create bubbles in the water in the interior of the draft tube to reduce the density of the water in a first zone adjacent to and above the respective air pipes and extending to the surface of the body of water wherein denser water in a second zone below said first zone moves upwardly through the draft tube from the lower end portion thereof toward the first zone and past the air pipes reducing the density thereof and thereby creating an overall, air-powered circulation pattern in the body of water passing up through the draft tube from the lower end portion to the upper end portion, substantially radially outwardly of the upper end portion substantially about said vertical axis toward the sides of the body of water, downwardly through the body of water, and substantially radially inwardly of the vertical axis toward and into the lower end portion of the draft tube wherein at least some of the first portions with the series of discharge holes therein of some of the air pipes extend substantially radially inwardly from the manifold into the interior of the draft tube and are inclined upwardly at an acute angle to the horizontal from the manifold into the interior of the draft tube.

2. The system of claim 1 wherein said some air pipes are linear tubes extending along and about respective axes.

3. The system of claim 1 wherein substantially all of said air pipes extend substantially radially inwardly from the manifold into the interior of the draft tube and are inclined upwardly at an acute angle to the horizontal from the manifold into the interior of the draft tube.

4. The system of claim 1 wherein said submerged manifold is positioned within the draft tube substantially between one and five feet below the surface of the body of water.

5. The system of claim 1 wherein at least other of the air pipes extend substantially horizontally from the manifold into the interior of the draft tube.

6. The system of claim 5 wherein said other air pipes extend continuously, horizontally across the interior of the draft tube from said manifold.

7. The system of claim 6 wherein said other air pipes extend substantially parallel to each other across the interior of the draft tube from said manifold.

8. The system of claim 5 wherein said other air pipes are substantially uniformly spaced from each other.

9. The system of claim 1 wherein the discharged air bubbles from the air pipes with the draft tube are the sole motive force resulting in the movement of water upwardly through the draft tube from the lower end portion to the upper end portion thereof to create and maintain said overall circulation pattern in said body of water.

10. The system of claim 9 wherein pressurized air is the sole motive force resulting in the movement of water upwardly through the draft tube from the lower end portion to the upper end portion thereof to create and maintain said overall circulation pattern in said body of water without any moving parts to assist in creating and maintaining said overall circulation pattern.

11. The system of claim 1 wherein said air pump is remote from said draft tube and said air-powered water circulation system further includes an air delivery conduit in fluid communication with and extending between the air pump and the submerged manifold, said air delivery conduit having a raised portion above the surface of the body of water adjacent the upper end portion of the draft tube forming an air trap between the submerged air manifold and the air pump to prevent water from rising from said submerged manifold past the air trap of the raised portion of the air delivery conduit toward the air pump.

12. The system of claim 11 wherein said air pump is located on land adjacent the sides of the body of water remote from the draft tube.

13. The system of claim 1 wherein the air pipes extend along and about respective axes and respectively have a second set of discharge holes spaced substantially 180 degrees horizontally about the axis of the respective air pipe from the first set of discharge holes, said first and second series of discharge holes of the respective air pipes extending along the respective pipe axes wherein respective series of discharge holes in adjacent air pipes face one another.

14. The system of claim 1 wherein said lower end portion of said draft tube has an inlet arrangement thereto including a substantially horizontal plate member spaced below the lower end portion and extending outwardly of and about said vertical axis.

15. The system of claim 1 further including a substantially planar lip extending outwardly of the upper end portion of the draft tube at least several inches and substantially about said vertical axis to aid in directing the water passing out of the upper end portion of the draft tube substantially radially outwardly thereof about said vertical axis toward the sides of the body of water.

16. The system of claim 1 further including a disinfectant line for delivering disinfectant into the draft tube adjacent the lower end portion thereof.

17. The system of claim 1 wherein the air pump is located on land adjacent the sides of the body of water remote from the draft tube.

18. The system of claim 1 wherein the submerged air manifold extends adjacent the inner surface of the draft tube.

19. The system of claim 1 wherein the air pipes respectively extend substantially across the interior of the draft tube.

20. An air-powered water circulation system for ponds, lakes, municipal water tanks, and other bodies of water having a surface and sides depending downwardly to a bottom, said system including:
a draft tube extending along and about a substantially vertical axis between upper and lower end portions and having an inner surface extending along and about the vertical axis substantially between said upper and lower end portions,
a flotation arrangement adjacent the upper end portion of the draft tube and supporting the upper end portion thereof adjacent and below the surface of the body of water,
a pneumatic, air-flow arrangement for supplying pressurized air above ambient from an air pump to a plurality of submerged air pipes positioned within said draft tube below the upper end portion thereof, said submerged air pipes extending inwardly from a submerged air manifold extending substantially about said vertical axis adjacent the inner surface of said draft tube, said manifold being in fluid communication with said air pump and said air pipes wherein said pressurized air is supplied from the air pump through said manifold to said air pipes,
said air pipes respectively extending inwardly of said manifold into and substantially across the interior of the draft tube forming an array of air pipes, said air pipes respectively having at least one series of discharge holes extending along the respective air pipes wherein said pressurized air supplied from said air pump through said manifold into said air pipes passes out of the discharge holes therein to create bubbles in the water in the interior of the draft tube to reduce the density of the water in a first zone adjacent to and above the respective air pipes and extending to the surface of the body of water wherein denser water in a second zone below said first zone moves upwardly through the draft tube from the lower end portion thereof toward the first zone and past the air pipes reducing the density thereof and thereby creating an overall, air-powered circulation pattern in the body of water passing up through the draft tube from the lower end portion to the upper end portion, substantially radially outwardly of the upper end portion substantially about said vertical axis toward the sides of the body of water, downwardly through the body of water, and substantially radially inwardly of the vertical axis toward and into the lower end portion of the draft tube wherein at least some of the air pipes extend substantially radially inwardly and upwardly from the manifold into the interior of the draft tube and wherein said some air pipes extend upwardly from the manifold substantially between 15 and 45 degrees to the horizontal.

21. The system of claim 20 wherein said manifold extends substantially horizontally about said vertical axis.

22. The system of claim 21 wherein said manifold is supported by said floatation arrangement at a predetermined distance below the surface of the body of water.

23. The system of claim 22 wherein said draft tube is collapsible and expandable along said vertical axis to selectively position the lower end portion thereof at varying distances below the upper end portion and below the predetermined distance of said manifold below the surface of the body of water.

24. An air-powered water circulation system for ponds, lakes, municipal water tanks, and other bodies of water having a surface and sides depending downwardly to a bottom, said system including:

a draft tube extending along and about a substantially vertical axis between upper and lower end portions and having an inner surface extending along and about the vertical axis substantially between said upper and lower end portions, a flotation arrangement adjacent the upper end portion of the draft tube and supporting the upper end portion thereof adjacent and below the surface of the body of water, a pneumatic, air-flow arrangement for supplying pressurized air above ambient from an air pump to a plurality of submerged air pipes positioned within said draft tube below the upper end portion thereof, said submerged air pipes extending inwardly from a submerged air manifold extending substantially about said vertical axis adjacent the inner surface of said draft tube, said manifold being in fluid communication with said air pump and said air pipes wherein said pressurized air is supplied from the air pump through said manifold to said air pipes, said air pipes respectively extending inwardly of said manifold into and substantially across the interior of the draft tube forming an array of air pipes, said air pipes respectively having at least one series of discharge holes extending along the respective air pipes wherein said pressurized air supplied from said air pump through said manifold into said air pipes passes out of the discharge holes therein to create bubbles in the water in the interior of the draft tube to reduce the density of the water in a first zone adjacent to and above the respective air pipes and extending to the surface of the body of water wherein denser water in a second zone below said first zone moves upwardly through the draft tube from the lower end portion thereof toward the first zone and past the air pipes reducing the density thereof and thereby creating an overall, air-powered circulation pattern in the body of water passing up through the draft tube from the lower end portion to the upper end portion, substantially radially outwardly of the upper end portion substantially about said vertical axis toward the sides of the body of water, downwardly through the body of water, and substantially radially inwardly of the vertical axis toward and into the lower end portion of the draft tube wherein at least some of the air pipes extend substantially radially inwardly from the manifold for different distances creating a non-uniform spacing pattern of said some air pipes in said array of air pipes to create a plurality of differently sized and shaped gaps between and among said some air pipes in said array to permit debris in the body of water of different sizes and shapes to pass though said gaps in said array of air pipes.

25. The system of claim 24 wherein said some air pipes extend upwardly from the manifold substantially between 15 and 45 degrees to the horizontal.

26. An air-powered water circulation system for ponds, lakes, municipal water tanks, and other bodies of water having a surface and sides depending downwardly to a bottom, said system including:

a draft tube extending along and about a substantially vertical axis between upper and lower end portions and having an inner surface extending along and about the vertical axis substantially between said upper and lower end portions, a flotation arrangement adjacent the upper end portion of the draft tube and supporting the upper end portion thereof adjacent and below the surface of the body of water, a pneumatic, air-flow arrangement for supplying pressurized air above ambient from an air pump to a plurality of submerged air pipes positioned within said draft tube below the upper end portion thereof, said submerged air pipes extending inwardly from a submerged air manifold extending substantially about said vertical axis adjacent the inner surface of said draft tube, said manifold being in fluid communication with said air pump and said air pipes wherein said pressurized air is supplied from the air pump through said manifold to said air pipes, said air pipes respectively extending inwardly of said manifold into and substantially across the interior of the draft tube forming an array of air pipes, said air pipes respectively having at least one series of discharge holes extending along the respective air pipes wherein said pressurized air supplied from said air pump through said manifold into said air pipes passes out of the discharge holes therein to create bubbles in the water in the interior of the draft tube to reduce the density of the water in a first zone adjacent to and above the respective air pipes and extending to the surface of the body of water wherein denser water in a second zone below said first zone moves upwardly through the draft tube from the lower end portion thereof toward the first zone and past the air pipes reducing the density thereof and thereby creating an overall, air-powered circulation pattern in the body of water passing up through the draft tube from the lower end portion to the upper end portion, substantially radially outwardly of the upper end portion substantially about said vertical axis toward the sides of the body of water, downwardly through the body of water, and substantially radially inwardly of the vertical axis toward and into the lower end portion of the draft tube wherein said some air pipes extend upwardly from the manifold toward the vertical axis substantially between 15 and 45 degrees to the horizontal and said some pipes have ends spaced from and about the vertical axis and from each other to create a gap extending about said vertical axis.

\* \* \* \* \*